US009113755B2

(12) United States Patent
Lam et al.

(10) Patent No.: US 9,113,755 B2
(45) Date of Patent: Aug. 25, 2015

(54) METHOD AND DEVICE FOR TREATMENT OF HUMAN EXCREMENT

(76) Inventors: Derek Lam, Hongkong (CN); Lai Yan Chan, Hongkong (CN)

( * ) Notice: Subject to any disclaimer, the term of this patent is extended or adjusted under 35 U.S.C. 154(b) by 105 days.

(21) Appl. No.: 13/263,747

(22) PCT Filed: Mar. 23, 2010

(86) PCT No.: PCT/CN2010/071204
§ 371 (c)(1),
(2), (4) Date: Dec. 15, 2011

(87) PCT Pub. No.: WO2010/133102
PCT Pub. Date: Nov. 25, 2010

(65) Prior Publication Data
US 2012/0031855 A1    Feb. 9, 2012

(30) Foreign Application Priority Data

May 20, 2009   (GB) .................................. 0908640.6

(51) Int. Cl.
*A47K 11/02*     (2006.01)
*B01D 37/00*     (2006.01)
*B01D 24/00*     (2006.01)

(52) U.S. Cl.
CPC ...................................... *A47K 11/02* (2013.01)

(58) Field of Classification Search
CPC .................................................... A47K 11/02
USPC .......... 4/111.1–111.6, 905, DIG. 11, DIG. 12
See application file for complete search history.

(56) References Cited

U.S. PATENT DOCUMENTS

| 3,921,228 | A | * | 11/1975 | Sundberg | .................. | 4/111.5 |
| 4,205,743 | A | * | 6/1980 | Whitmore | ................... | 198/393 |
| 4,627,116 | A | * | 12/1986 | Shimizu | .................. | 4/111.6 |
| 6,101,638 | A | * | 8/2000 | Hammond | ................... | 4/111.1 |
| 2005/0235406 | A1 | * | 10/2005 | August | ................... | 4/493 |

FOREIGN PATENT DOCUMENTS

| FR | 2722810 A | * | 7/1994 |
| JP | 52033342 A | * | 3/1977 |

OTHER PUBLICATIONS

Machine translation of FR 2,722,810 A.*

* cited by examiner

*Primary Examiner* — Huyen Le
*Assistant Examiner* — Christine Skubinna

(57) ABSTRACT

A method for treatment of human excrement comprises the following steps: (1) providing a chamber (5) having a top opening through which excrement enters the chamber (5); (2) allowing solid excrement to form a layer on a porous plate (6) inside the chamber (5) by gravity wherein excrement is stored firstly at front storing region (13) and secondly at rear storing region (14), and allowing urine to fall down into the urine storing region (15) through perforations in the porous plate (6); (3) ventilating the interior of chamber (5) by a ventilation system, and providing an indirect heat source (7) inside the chamber (5). A device for treatment of human excrement comprises the chamber (5), the porous plate (6) with the front storing region (13) and the rear storing region (14), the urine storing region (15), the ventilation system and the indirect heat source (7).

1 Claim, 4 Drawing Sheets

METHOD AND DEVICE FOR TREATMENT OF HUMAN EXCREMENT

FIELD OF THE INVENTION

The present invention relates to a method and a device for treatment of human excrement by collecting and dehydrating excrement and more particularly to a method and a device for treatment of human excrement through collection and dehydration of primary excrement as expelled from human body without polluting the environment.

BACKGROUND OF THE INVENTION

In many areas where waterborne system is not available, people usually collect excrement in a container by piling up with straw for undergoing anaerobic degradation. Such a heap sends forth a foul smell which pollutes the environment.

There are also a number of previously known biological toilets to improve above situation. However, these biological toilets are not satisfying in terms of dehydration efficiency and maintenance point of view because excrement usually stains the passageway causing inconvenience to next user and excrement forms high pile getting difficult to be dehydrated particularly at center portion and new excrement hinders dehydration process. The present invention is a need for an improved method and a device to overcome the shortcomings of the prior art.

OBJECTS OF THE INVENTION

It is an aim of present invention to provide a method for treatment of human excrement by collecting and dehydrating excrement expelled from human body.

Another aim of present invention is to provide a device for treatment of human excrement by collecting and dehydrating excrement expelled from human body.

SUMMARY OF THE INVENTION

To achieve the aforementioned aims, one aspect of the present invention provides a method for treatment of human excrement, said method comprises step of providing a chamber having a top opening through which excrement enters said chamber;

The method also comprises step of setting up a porous storing plate across upper half interior of said chamber wherein said plate features to have a protrusion located under said top opening and inclines downwardly and then extends horizontally away from said top opening in form of a series of corrugations whereby said protrusion widens movement of excrement down across inclined plate and excrement moves across corrugated area through gravity to form a layer The method also comprises step of allowing urine to fall down into urine storing region located at bottom of chamber through perforations of porous plate;

The method further comprises step of setting up two excrement layer storing regions namely front storing region located under said top opening and rear storing region located away from said top opening by mounting a baffle vertically on said series of corrugations of said plate whereby excrement is firstly stored at front storing region and secondly at rear storing region The method also still further comprises step of dehydrating excrement layer by ventilating said chamber interior by means of a ventilation system located at top ceiling area of front storing region which draws air in through an end wall of rear storing region, down through porous plate into urine storing region and backup through porous plate into front storing region and then exits through ventilation system;

The method further another comprises step of providing an indirect heat source inside chamber wherein heat penetrates excrement without touching.

Another aspect of the present invention provides a device for treatment of human excrement comprising a chamber having a top opening through which excrement enters said chamber;

According to one embodiment of the present invention, said top opening is defined by a bowl having an upwardly-tapered interior wherein top entrance inner circumference is smaller than interior circumference to prevent staining of solid excrement and said bowl is provided therein with an inclined inner trough and a vertical inner trough opposed to inclined inner trough both are extending downwardly, thereby forming a tunnel having an outlet and providing a vertical passageway penetrating into chamber interior to minimize visibility. Each of inner surfaces of troughs is covered with a coating that improves sliding of excrement. The inclined trough has a bottom end centered vertically to center of top entrance of said bowl so as to allow direct dropping of solid excrement into said chamber;

According to another embodiment of the present invention, said top opening is defined by a squat pan having an oblong interior, and squat pan is provided therein with an inclined inner trough and a vertical inner trough opposed to inclined inner trough both are extending downwardly, thereby forming a tunnel having an outlet and providing a vertical passageway penetrating into chamber interior to minimize visibility. Each of inner surfaces of troughs is covered with a coating that improves sliding of excrement. The inclined trough also has a bottom end centered vertically to center of top entrance of said squat pan so as to allow direct dropping of solid excrement into said chamber;

The device comprises a porous storing plate mounted across upper half interior of chamber and said plate features to have a protrusion located under said top opening and inclines downwardly and then extends horizontally away from said top opening in form of a series of corrugations whereby said protrusion widens movement of excrement down across inclined plate and excrement moves across corrugated area through gravity to form a layer whereas urine falls down into urine storing region at bottom of chamber through perforations of porous plate;

The device further comprises two excrement layer storing regions namely front storing region located under said top opening and rear storing region located away from said top opening formed by mounting a baffle vertically on said series of corrugations whereby excrement is firstly stored at front storing region and secondly at rear storing region;

The device still further comprises a ventilation system located at top ceiling area of front storing region which draws air in through an end wall of rear storing region, down through porous plate into urine storing region and backup through porous plate into front storing region and then exits out through ventilation system, air circulation dehydrates excrement layer;

The device further another comprises an indirect heat source inside said chamber wherein heat penetrates excrement without touching.

The invention will now be described in detail, by way of example, with reference to the drawings.

DETAILED DESCRIPTION OF THE PREFERRED EMBODIMENT

Figure 1:
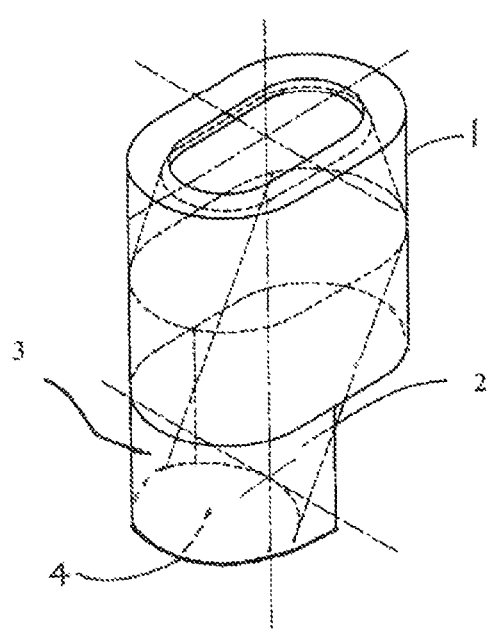
FIG. 1 is a perspective view of a bowl to be used in an embodiment of the present invention.

FIG. 1 shows a perspective view of a bowl (1) to be used in the present invention. A bowl (1), provided for sitting on to defecate and urinate, includes an upwardly-tapered interior wherein top entrance inner circumference is smaller than interior circumference to avoid excrement staining on inner wall thereof. Bowl (1) further includes an inclined inner trough (2) extending inwardly and downwardly and a vertical inner trough (3) opposed to inclined trough (2), with each of troughs (2) and (3) having a curved surface forming a vertical passageway having an outlet (4) penetrating into interior of said chamber (5) to minimize visibility. Each of inner surfaces of troughs (2), (3) is covered with a coating to improve sliding of excrement. Inclined trough (2) has a bottom end centered vertically to center of top entrance of said bowl (1) so that when human body sits on bowl (1) at normal posture, anus of human body is located above central area of outlet (4), as clearly shown in FIG. 1, enabling solid excrement enters chamber (5) directly, whereas urine pushes remaining solid excrement left behind on inclined trough (2) into chamber (5).

Figure 2:
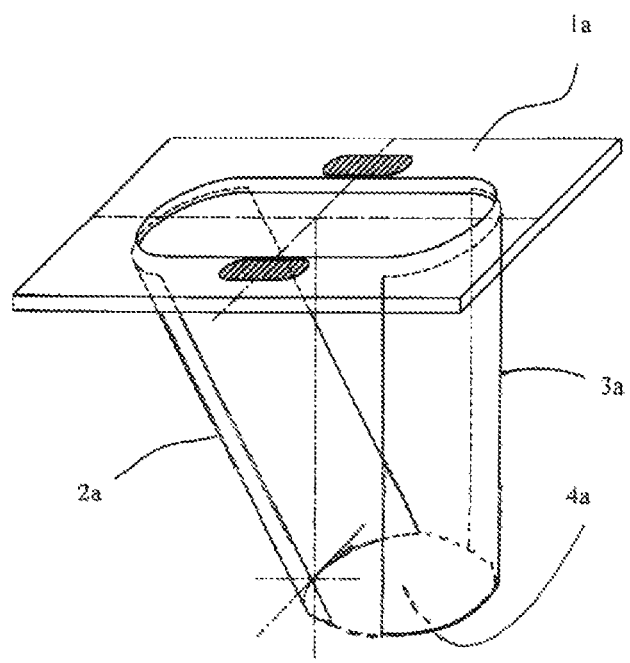
FIG. 2 is a perspective view of a squat pan to be used in another embodiment of the present invention.

Alternatively, a squat pan (1a) of FIG. 2 is used instead of bowl (1) of FIG. 1. As shown in FIG. 2, squat pan (1a), provided for squatting across to defecate and urinate, includes an oblong interior. Squat pan (1a) further includes an inclined inner trough (2a) extending inwardly and downwardly and a vertical inner trough (3a) opposed to inclined trough (2a) forming a vertical passageway having an outlet (4a) penetrating into interior of said chamber (5) to minimize visibility. Each of inner surfaces of troughs (2a), (3a) is covered with a coating that improves sliding of excrement. Inclined trough (2a) here also has a bottom end centered vertically to center of top entrance of squat pan (1a) so that when human body squats across squat pan (1a) at normal squatting posture, anus of human body is located above central area of outlet (4a) enabling solid excrement enters said chamber (5) directly, whereas urine pushes remaining solid excrement still left behind on inclined trough (2a) into chamber (5) as clearly shown in FIG. 2. Regardless of the difference between bowl (1) and squat pan (1a), their respective inner troughs (2,2a) and (3,3a) form an outlet (4,4a) providing a vertical passageway between them as top opening of said chamber (5).

Figure 3:
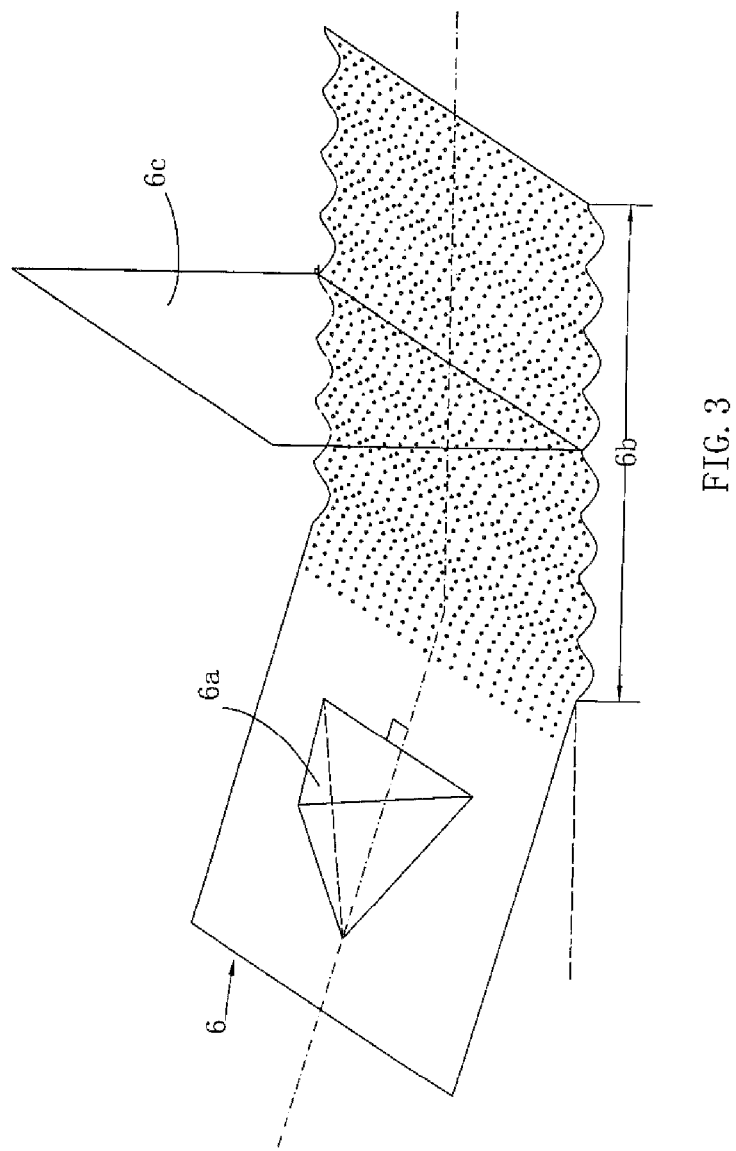
FIG. 3 is a perspective view of a porous storing plate to be used in an embodiment of the present invention.
Figure 4:
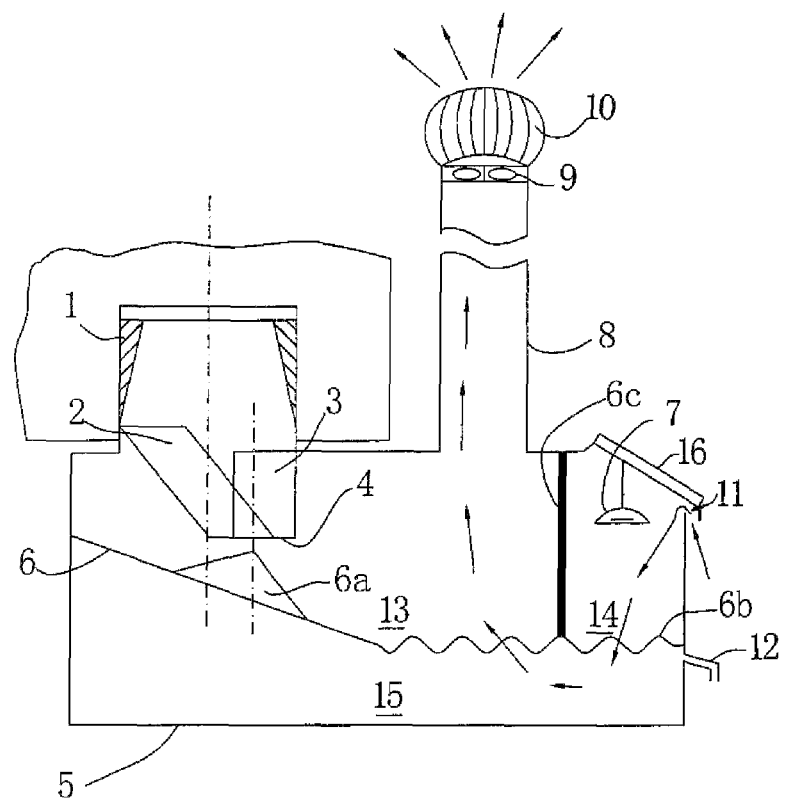
FIG. 4 is a cross-sectional view of the embodiment of the present invention used with the bowl of FIG. 1

FIG. 3 shows a perspective view of a porous storing plate (6) to be used in the present invention. The porous storing plate (6) inclines and comprises a protrusion in form of equilateral triangular pyramid (6a) whose bottom lower side intersects perpendicularly to center line of plate (6). The plate (6) extends horizontally in form of a series of corrugations (6b) wherein holes distribute on lower surface of slope and on surface of corrugated area (6b) where a baffle (6c) is mounted on vertically; As shown in FIG. 4, chamber (5) having topped with a bowl (1) as per FIG. 1 is defined by a first end wall located adjacent to top opening, a second end wall located away from top opening, and a pair of side walls (only one is shown) extending between end walls. Said plate (6) as shown in FIG. 3 is mounted across upper half interior of chamber (5) to form a front storing region (13), a rear storing region (14) and a urine storing region (15) wherein the equilateral triangular pyramid (6a) comprising three slopes located under outlet (4) of bowl (1) widens movement of excrement down across inclined plate (6) and excrement moves across series of corrugations (6b) by gravity to forms a layer. Urine falls down into urine storing region (15) through perforations of said plate (6), wherein excrement layer is firstly stored at front storing region (13) and secondly at rear storing region (14) through manhole cover (16). A set of ventilation system comprising ventilating duct (8) topped with exhaustion fan (9) and wind turbine (10) located at top ceiling area of front storing region (13) draws air in through end wall (11) of rear storing region (14), down through plate (6) into urine storing region (15) and backup through plate (6) into front storing region (13) and then exits through the ventilation system. Air circulation dehydrates excrement layer. An indirect heat source (7) located at rear storing region (14) wherein heat penetrates excrement layer without touching. Excess urine may be drained out of urine storing region (15) through an overflow exit (12) located under plate (6) to avoid flooding of excrement layer. Eventually dry and harmless substance is obtained through manhole cover (16) of chamber (5).

Although embodiments together with structures and functions of present invention have been described in detail, many modifications and variations may be made from the teachings disclosed hereinabove. Therefore, it should be understood by those skilled in the art that any modification and variation equivalent to the scope of present invention should be regarded to fall within the scope of the appended claims.

What is claimed is:

1. A method for treatment of human excrement comprising steps of:
providing a chamber having a top opening through which excrement enters the chamber; setting up a porous storing plate inside the chamber and said storing plate inclines and features to have a protrusion located under the top opening and the storing plate extends horizontally in form of a series of corrugations on which a baffle is mounted to form front and rear storing regions; allowing urine to fall down into a urine storing region at a bottom of the chamber through perforations in the storing plate; storing an excrement layer firstly at the front storing region and then at the rear storing region; ventilating the chamber interior by a ventilation system located at a top area of the chamber wherein air is drawn in through an air inlet at the rear storing region and passing through the storing plate into the urine storing region and then back up through the storing plate into the front storing region and then exits the chamber.

* * * * *